April 28, 1936.   A. D. PATCHEN   2,039,110
SEPARABLE FASTENER
Filed Sept. 17, 1934
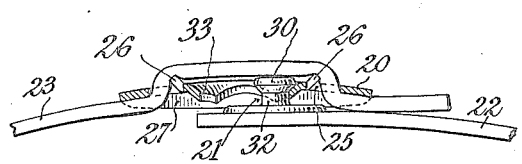
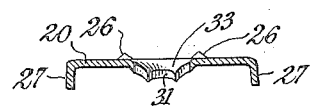
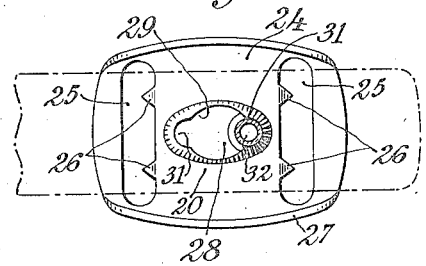
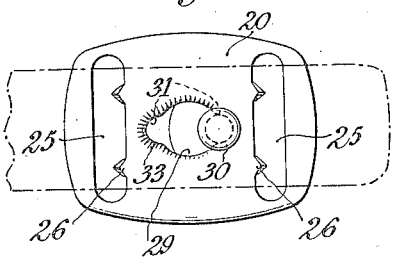
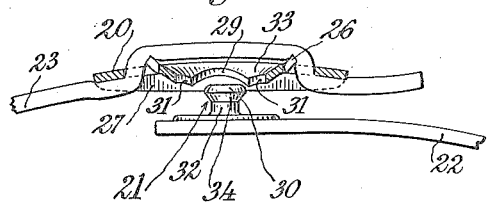
INVENTOR
Arthur D. Patchen
BY Fraser, Myers & Manley
ATTORNEYS Patented Apr. 28, 1936

2,039,110

UNITED STATES PATENT OFFICE 2,039,110

SEPARABLE FASTENER

Arthur D. Patchen, Waterbury, Conn., assignor to Scovill Manufacturing Company, Waterbury, Conn., a corporation of Connecticut Application September 17, 1934, Serial No. 744,321

9 Claims. (Cl. 24—77)

This invention relates to an improved separable fastener of the stud and eyelet form, and, although of general application, is well adapted for use as a means of detachably securing together the end portions of straps such as are used on gloves, overshoes, and other articles of wearing apparel, in which case it is usual to secure at least one of the elements to one of the parts to be attached by means such that it may be readily shifted to various positions along the strap on which it is used and be securely held in any such position of adjustment. When so used, the adjustable fastener element is commonly designated a fastener slide. As already explained, however, the device is not limited in its application to use as a means of securing two straps together. The stud, for example, might be secured to the body of a carriage or motor vehicle and the slotted element might be secured to a curtain or other part of the vehicle trimming to be detachably attached to the stud.

Separable fasteners of the above-described character have heretofore been made of which the eyelet element comprises a plate having a keyhole slot therein, the larger end of the slot being of dimensions such as to freely pass over the head of the stud and the smaller end being of a size adapted to receive the neck of the stud but not sufficiently large to permit the head to be released. Such fasteners have served as a satisfactory means of detachably connecting the parts to which the fastener elements are secured so long as they are subjected to pulling forces in opposite directions such as to maintain the stud in the contracted portion of the slot, but in order to detach the fastener parts it has been found necessary to draw the two fastener elements in directions opposed to the directions in which they are normally pulled when serving their intended purposes as a fastener before they can be separated by relative movement in the direction of the axis of the stud. This necessity of first moving the parts in opposite directions parallel with the surface of the plate before separating them by movements in the direction of the axis of the stud has been unsatisfactory in that the user quite frequently has damaged the fastener in an attempt to separate the parts by a direct movement of one fastener element away from the other without first moving them to positions in which the stud is in the large portion of the opening.

It is an object of the present invention to provide an improved fastener of which the stud and slotted plate, when in engagement, have mutually contacting flared or cam-like surfaces so positioned that a direct outward pull on one of the fastener elements in a direction parallel with the axis of the stud will cause the stud to be moved towards and into the relatively large head releasing opening of the slot in the plate and permit the parts to be separated, thus facilitating the disengagement of the fastener parts and eliminating the element of damage to the fastener as a result of attempts to disengage its parts in an unintended manner.

In the accompanying drawing illustrating the preferred form of the invention:—

Figure 1 is a face view of a pair of attached fastener elements embodying the invention, the portions of straps to which the elements may be secured being indicated in broken lines.

Fig. 2 is a reverse view of the fastener illustrated by Fig. 1, in which the parts of straps to which the fastener elements may be applied are again represented by broken lines.

Fig. 3 is a central, longitudinal, sectional view of the fastener illustrated by Figs. 1 and 2, the parts of the fastener being represented as having been secured to portions of straps represented in full lines.

Fig. 4 is a view of the same fastener, which differs from Fig. 3 only in that the parts are represented as having been detached.

Fig. 5 is a transverse, central, cross-sectional view of the fastener illustrated by Figs. 1 to 4, inclusive.

The form of fastener which has been selected for use as a means of illustrating the invention comprises an eyelet element 20 and a stud element 21 which may be secured to any two relatively movable parts to be detachably attached to each other, such, for example, as the strap end 22 and the strap end 23. The eyelet element 20 may comprise a plate 24 having appropriate means, such as the slots 25 and spurs 26, by which it may be assembled with the strap end 23, along which it may be readily shifted from one position to another and held in any desired position of adjustment in a well-known manner.

It will be obvious that either or both of the elements of the fastener may be provided with adjustable means of the above-described character whereby the attached element or elements may serve as a fastener slide capable of being readily shifted along a flexible strap and securely held in any desired position. If, as illustrated, the eyelet element is selected as the adjustable slide, the stud 21 may be permanently secured to the strap end 22 in any appropriate manner.

The body portion of the eyelet element may, as illustrated, be slightly curved or crowned so as to be substantially, but not absolutely, flat, and, if desired, it may be strengthened by marginal ribs 27.

The slot 28 in the eyelet element 29 may preferably be of the double-ended keyhole type having a relatively large central portion 29 of dimensions such as to freely permit the head 30 of the stud 21 to be passed therethrough and relatively small or contracted end portions 31 of dimensions such as to permit the neck portion 32 of the stud to be moved into the end of the slot, the contracted portions 31 of the slot being smaller than the head of the stud so as to prevent the head from being withdrawn from the slot without first being moved towards the enlarged central opening 29.

As an important element of the invention to be claimed in this case, the parts of the eyelet plate adjacent the contracted end portions 31 of the keyhole slot are flared downwardly and inwardly from the face of the body portion of the eyelet plate, as indicated at 33, so that an attempt to separate the fastener elements by pulling them away from each other in directions parallel with the axis of the stud will cause the stud to be cammed by the inclined wall underlying its head towards and into the enlarged opening at the center of the plate and to thus permit the head to be withdrawn.

If desired, the detachment of the stud element from the eyelet element by pulling the stud element in the direction of the axis of the stud may be further facilitated by the use of a stud having an upwardly and outwardly flaring surface 34 connecting its neck 32 with its head 30.

It will be apparent that when the stud has been inserted in the eyelet slot and the parts have been drawn to the relative positions illustrated by Figs. 1, 2, and 3, the fastener elements will serve as a satisfactory means of preventing the separation of the strap ends to which they are secured as long as forces are applied tending to pull them apart. If, however, it is at any time desired to separate the fastener elements and permit the strap ends to be disconnected, this may be readily accomplished by grasping one of the strap ends and pulling it outwardly away from the other so as to tend to separate the parts of the fastener by relative movement in the direction of the axis of the stud. Although, in view of the relative dimensions of the parts, the stud can not be withdrawn from the slot while located in the contracted end portion 31, the inclined or cam-like surface 33 in cooperation with the inclined surface 34 of the stud, if used, will cause the stud to be moved toward the enlarged portion of the slot as the eyelet element is pulled outwardly to a position such that the head of the stud may be released, the relative movement between the two parts of the fastener being an angular one having a component parallel to the axis of the stud in the direction in which the eyelet element is being pulled and a component perpendicular to the axis of the stud, which causes the stud to be moved out of the contracted end of the slot and into the enlarged portion through which the head is to be released.

The invention is not intended to be limited to the preferred form herein selected for purposes of illustration, but should be regarded as including modifications and variations thereof within the scope of the appended claims.

What is claimed is:—

1. A separable fastener element comprising a plate of rigid material provided with means whereby it may be secured to one of two parts to be detachably attached and with a slot of the keyhole type having a stud receiving portion of dimensions such that the end of a headed stud intended to be used with the fastener element may be freely passed therethrough and a contracted stud engaging end portion of substantially semicircular form opening directly into the stud receiving portion and of dimensions such as to receive the neck of the stud and prevent the release of its head, the portion of the fastener intended to underlie the head of an engaged stud being gradually flared inwardly and downwardly about the part immediately outlying the stud head engaging end of the slot, towards and to the enlarged head releasing portion, at a degree of inclination such that opposed forces tending to separate the fastener element from an engaged stud by relative movement in a direction substantially parallel with the axis of the stud will cause the stud to be cammed towards and into the enlarged head releasing portion of the slot.

2. A fastener element, as defined by claim 1, of which the slotted plate is symmetrical with respect to a transverse axis and of which the keyhole slot has a stud head receiving portion at its center and contracted stud head retaining portions with cam-like head engaging surfaces at its opposite ends.

3. A fastener element, as defined by claim 1, of which the slotted plate is symmetrical with respect to a transverse axis and also with respect to a longitudinal axis, and of which the keyhole slot has a stud head receiving portion at its center and contracted stud head retaining portions with cam-like head engaging surfaces at its opposite ends, the longitudinal axis of the keyhole slot being substantially coincident with the longitudinal axis of the plate.

4. A fastener element, as defined by claim 1, of which the means whereby it may be secured to one of two parts to be detachably attached comprises slots in the plate having wall portions so disposed that the fastener element may be readily adjusted to various positions along a flexible strap and securely held in any such position of adjustment.

5. A separable fastener comprising, in combination, a plate of rigid material having a stud receiving slot therein of the keyhole type and means whereby the plate may be secured to one of two parts to be detachably attached and a headed stud which may be connected with the other of the two parts to be detachably attached, the slot in the plate having a stud receiving portion of dimensions such that the head of the stud may be freely passed therethrough and a contracted stud engaging end portion of substantially semicircular form opening directly into the stud receiving portion and of dimensions such as to receive the neck of the stud and prevent the release of its head, the portion of the fastener underlying and adjacent to the head of the engaged stud being gradually flared inwardly and downwardly about the contracted stud engaging end of the slot towards and to its enlarged head releasing portion, at a degree of inclination such that opposed forces tending to separate the fastener elements by relative movement in a direction parallel with the axis of the stud will cause the stud to be cammed towards and into the enlarged head releasing portion of the slot.

6. A separable fastener, as defined by claim 5, of which the stud is flared upwardly and outwardly from its neck to its head to facilitate the camming action between the plate and the stud when the fastening elements are being subjected to forces tending to separate them by relative movement parallel with the axis of the stud.

7. A separable fastener, as defined by claim 5, of which the means whereby the fastener elements may be secured to the parts to be detachably attached includes means whereby one of said parts may be adjusted to various positions along a flexible strap and securely held in any such position of adjustment.

8. A separable fastener, as defined by claim 5, of which the slotted plate is symmetrical with respect to a transverse axis and of which its keyhole slot has its stud head receiving portion at its center and contracted stud head retaining portions with cam-like head engaging surfaces at its opposite ends.

9. A separable fastener, as defined by claim 5, of which the slotted plate is symmetrical with respect to a transverse axis and also with respect to a longitudinal axis and of which its keyhole slot has a stud head receiving portion at its center and contracted stud head retaining portions with cam-like head engaging surfaces at its opposite ends, the longitudinal axis of the keyhole slot being substantially coincident with the longitudinal axis of the plate.

ARTHUR D. PATCHEN.